(12) United States Patent
Kacir

(10) Patent No.: US 7,124,534 B1
(45) Date of Patent: Oct. 24, 2006

(54) FLOATING FISH SNARING DEVICE

(76) Inventor: Kyle Alan Kacir, 666 CR 101, Rogers, TX (US) 76569

( * ) Notice: Subject to any disclaimer, the term of this patent is extended or adjusted under 35 U.S.C. 154(b) by 0 days.

(21) Appl. No.: 11/118,906

(22) Filed: Apr. 29, 2005

Related U.S. Application Data

(60) Provisional application No. 60/574,776, filed on May 26, 2004.

(51) Int. Cl.
*A01K 91/10* (2006.01)
(52) U.S. Cl. .................................................. 43/15
(58) Field of Classification Search ............. 43/15–17
See application file for complete search history.

(56) References Cited

U.S. PATENT DOCUMENTS

| | | | | |
|---|---|---|---|---|
| 1,317,496 A * | 9/1919 | Hessler | 43/17 |
| 2,379,676 A * | 7/1945 | Blackstone | 43/44.88 |
| 2,493,971 A * | 1/1950 | Johnson | 43/17 |
| 2,500,078 A * | 3/1950 | Ingram | 43/17 |
| 2,587,190 A * | 2/1952 | Merriweather | 43/17 |
| 2,784,515 A * | 3/1957 | McBride et al. | 43/15 |
| 2,790,263 A * | 4/1957 | Chaney | 43/17 |
| 2,818,671 A * | 1/1958 | Crouch | 43/15 |
| 2,825,175 A * | 3/1958 | Skvier | 43/44.91 |
| 2,876,578 A * | 3/1959 | Argenio | 43/15 |
| 3,023,532 A * | 3/1962 | Gorenty | 43/17 |
| 3,106,797 A * | 10/1963 | Hancock | 43/43.11 |
| 3,660,922 A * | 5/1972 | Chill | 43/15 |
| 3,766,680 A | 10/1973 | Torme et al. | 43/16 |
| 3,974,588 A | 8/1976 | Blom et al. | 43/15 |
| 4,359,836 A * | 11/1982 | Yuji | 43/44.9 |
| 4,565,024 A * | 1/1986 | Maerz | 43/17 |
| 4,571,878 A * | 2/1986 | Nyman | 43/43.11 |
| 4,667,432 A * | 5/1987 | Torgrimson | 43/17 |
| 5,199,205 A * | 4/1993 | Klammer | 43/17 |
| 5,224,284 A * | 7/1993 | Kelsey et al. | 43/17 |
| 5,253,445 A * | 10/1993 | Spoonemore | 43/17 |
| 5,309,663 A * | 5/1994 | Shirley | 43/15 |
| 5,438,788 A * | 8/1995 | Rich et al. | 43/15 |
| 5,758,451 A * | 6/1998 | Wolfe | 43/44.91 |
| 5,784,829 A * | 7/1998 | Latta | 43/44.91 |
| 5,819,465 A * | 10/1998 | Bryant | 43/16 |
| 5,937,565 A * | 8/1999 | Maric et al. | 43/15 |
| 6,029,391 A * | 2/2000 | Holley et al. | 43/43.11 |
| 6,105,299 A * | 8/2000 | Rich | 43/15 |
| 6,397,510 B1 * | 6/2002 | Klein | 43/17 |
| 6,405,474 B1 * | 6/2002 | Taunton | 43/15 |
| 6,493,981 B1 * | 12/2002 | Izzard | 43/15 |
| 6,519,893 B1 * | 2/2003 | Shook | 43/17 |
| 6,796,076 B1 * | 9/2004 | Bennett | 43/16 |

FOREIGN PATENT DOCUMENTS

DE 3714124 A1 * 11/1987
EP 561747 A1 * 9/1993

(Continued)

*Primary Examiner*—Darren W. Ark
(74) *Attorney, Agent, or Firm*—Kenneth L. Tolar

(57) ABSTRACT

A floating fish snaring device includes a housing formed of a buoyant, but lightweight material. Coaxially received within the housing and extending a predetermined distance from the lower end thereof is an elongated hollow tube. Longitudinally received within the tube is an elongated fish snaring member including a float at a lower end and a cap member at an upper end. Upper and lower annular stop members are fixedly positioned within the tube. A fishing line with an attached hook is secured to an eyelet on the float. When a fish strikes the bait and drags the fish snaring member downwardly, the cap member engages the upper stop member resulting in significant recoil of the fishing line thereby firmly setting the hook in the fish's mouth.

11 Claims, 1 Drawing Sheet

FOREIGN PATENT DOCUMENTS

| | | | | |
|---|---|---|---|---|
| GB | 1603769 | A1 | * | 11/1981 |
| GB | 2157931 | A | * | 11/1985 |
| GB | 2208781 | A | * | 4/1989 |
| GB | 2390965 | A | * | 1/2004 |
| JP | 3-139233 | A | * | 6/1991 |
| JP | 4-234933 | A | * | 8/1992 |
| JP | 7-87871 | A | * | 4/1995 |
| JP | 10-52204 | A | * | 2/1998 |
| JP | 10-286050 | A | * | 10/1998 |
| JP | 11-169040 | A | * | 6/1999 |
| JP | 2001-333677 | A | * | 12/2001 |
| WO | WO-96/34524 | A1 | * | 11/1996 |

* cited by examiner

FLOATING FISH SNARING DEVICE

CROSS REFERENCE TO RELATED APPLICATIONS

This application is entitled to the benefit of provisional application No. 60/574,776 filed on May 26, 2004.

BACKGROUND OF THE INVENTION

The present invention relates to a floating fish snaring device having a means for automatically setting a hook without assistance from the fisherman.

DESCRIPTION OF THE PRIOR ART

Fishing is an extremely popular hobby. However, enjoyment of the hobby is somewhat diminished because a fisherman must continuously hold or monitor the fishing rod to determine if a fish strikes the bait so that he or she may properly set the hook before the fish escapes. Although using a cork and/or a fishing rod holder somewhat minimizes the need to continuously hold a rod, a user must still constantly monitor the fishing rod to determine if a fish has struck the bait. Additionally, when a strike is observed, the fisherman must immediately grab and jerk the rod to set the hook. Sometimes even a brief distraction can result in a lost fish. Accordingly, there is a need for a device that allows a fisherman to more easily hook a fish.

A myriad of automated fish snaring devices have been heretofore designed to address this need. For example, U.S. Pat. No. 3,766,680 issued to Torme, et al. discloses a combined bobber and hook setting mechanism including a spring-loaded shaft mounted within a sleeve. An eye hook is positioned at a lower end of the shaft to which a fishing line is attached. The sleeve is positioned within a float such that the spring-biased shaft pulls upwardly once being pulled downwardly by a striking fish.

U.S. Pat. No. 3,974,588 issued to Blom, et al. discloses a fishing lure having a hook and shaft that include springs and holding mechanisms designed to initially allow the hook to move toward the fish but which pull the hook toward the lure immediately thereafter.

U.S. Pat. No. 5,937,565 issued to Maric, et al. discloses a float having an automatic triggering device including a spring-biased sleeve positioned within a housing that is normally in a locked position. A release means unlocks the sleeve when a fish pulls fishing line received within the sleeve. Subsequently, a spring jerks the line upwardly to set the hook in a fish's mouth.

U.S. Pat. No. 6,405,474 issued to Taunton discloses a flotation and fish hook setting device including an elongated tubular member having open ends and an axial bore. Received within the bore is an elastic member having fishing line members and associated hooks secured thereto. A float encapsulates the tubular member.

U.S. Pat. No. 6,493,981 issued to Izzard discloses a slip bobber with a hook setting device. The device includes a float having a sleeve received therein. A spring-biased slide is positioned within the sleeve that is normally retained against the bias of the spring with a sliding lock lever. Fishing line is secured to a release lever that releases the slide when a fish pulls the fishing line. The biased slide then moves upwardly causing the hook to be set.

As indicated above, many floating fish snaring devices exist in the prior art; however, each of the above referenced devices rely on springs to apply a recoil to the fishing line which makes the device more expensive to manufacture. Furthermore, metallic springs will corrode rapidly when subjected to moisture thereby significantly diminishing the useful life of the device.

The present invention overcomes the disadvantages associated with prior art fish snaring devices by providing a floating device that includes a snaring member to which a line and hook are attached. The snaring member includes a cap at an upper end that engages a stop member when pulled downwardly by a fish to set the hook within the fish's mouth.

SUMMARY OF THE INVENTION

The present invention relates to a floating fish snaring device. The device comprises a substantially hollow housing formed of a buoyant but resilient material such as closed cell foam, cork or a similar material. Coaxially received within the housing is an elongated hollow tube having a lower portion extending beyond a lower end of the housing. Fixedly positioned within the tube are upper and lower annular stop members. Attached to a lower end of the tube is a weighted collar for ballasting the housing in an upright position when floating in water. Longitudinally received within the tube is an elongated fish snaring shaft having a cap member at an upper end and a small float at a lower end. The float includes an eyelet to which a fishing line and accompanying hook can be attached.

To use the above described device, the fishing line, hook and sinker (if necessary) are attached to the float eyelet. The appropriate bait is attached to the hook and the device is placed in a body of water whereby the housing will freely float. Upon a fish striking and attempting to escape with the bait, the fish snaring shaft will be pulled downwardly with substantial force until the cap member engages the upper annular stop member. The resulting recoil applied to the fishing line will firmly set the hook within the fish's mouth. Attempting to drag the buoyant housing beneath the water will eventually tire the fish allowing the fisherman to easily retrieve the fish from the hook.

It is therefore an object of the present invention to provide a fish snaring device that allows a fisherman to quickly and easily snare a fish.

It is another object of the present invention to provide a fish snaring device that will snare a fish without holding or monitoring a fishing rod.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
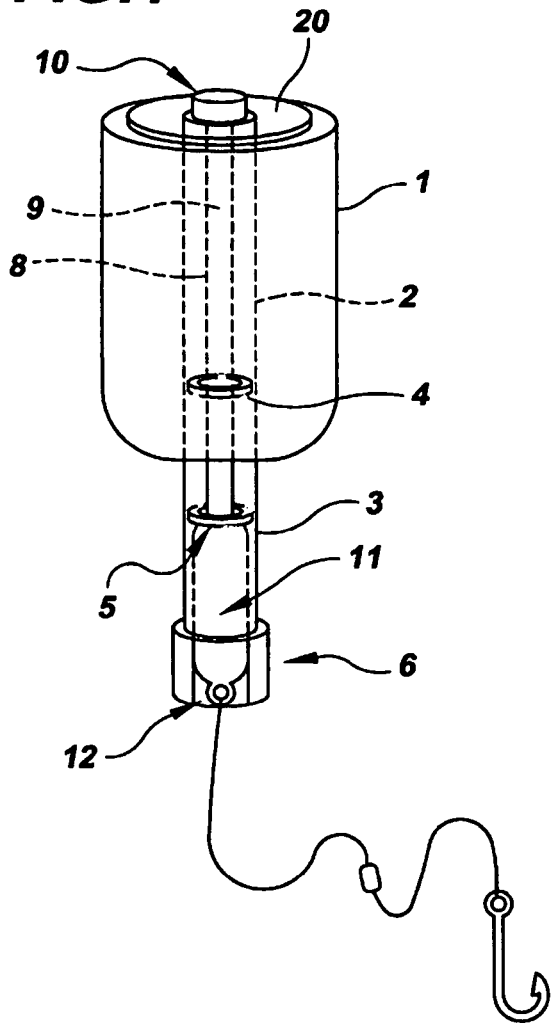
FIG. 1 is a perspective view of the device with the fish snaring member in a raised, normal position.
Figure 2:
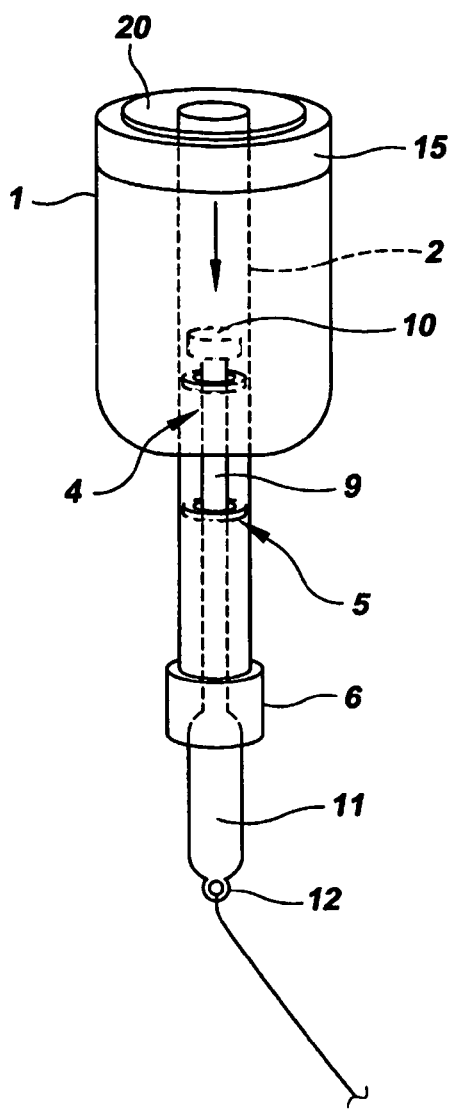
FIG. 2 is a perspective view of the device with the fish snaring member in a deployed position.
Figure 3:
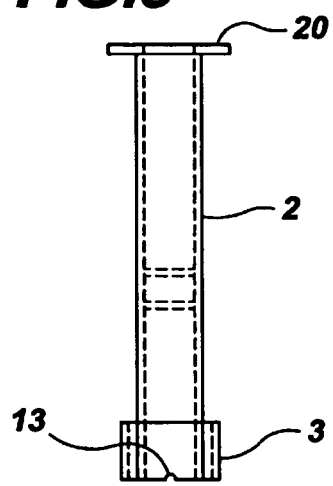
FIG. 3 is a detailed view of the hollow tube.

Now referring to FIGS. 1–3, the present invention relates to a floating fish snaring device. The device comprises a substantially hollow housing 1 formed of a buoyant but resilient material such as closed cell foam, cork, or a similar material. Preferably, the housing includes a circumferential reflective strip 15 at an upper end thereof to allow a fisher to easily locate the device when fishing at night. Coaxially received within the housing is an elongated hollow tube 2 having a lower portion 3 extending beyond a lower end of the housing. At an upper end of the tube is a plate 20 that rests on the upper end of the housing to prevent the housing from sliding up the tube during use. The plate 20 and upper end of the housing 1 extending in parallel planes. Fixedly positioned in the tube are upper 4 and lower 5 annular stop members. Attached to a lower end of the tube is a weighted collar 6 for ballasting the housing in an upright position when floating in water.

Longitudinally received within the tube is an elongated fish snaring member 8 having a shaft 9 with a cap member 10 at an upper end thereof and a small float 11 at a lower end. The float includes an eyelet 12 to which a fishing line and accompanying hook can be attached. The small float 11 having a diameter that is smaller than a diameter of the tube 2.

Both the hollow tube and collar include an aligned slot 13 thereon for receiving fishing line. Accordingly, when the device is not in use, the fishing line is first threaded into the slots and then wrapped about the housing whereby the slots prevent the line from unwinding.

To use the above described device, the fishing line, hook and sinker (if necessary) are attached to the float eyelet. The appropriate bait is attached to the hook and the device is placed in a body of water whereby the housing will freely float. The lower annular stop member prevents the float from rising within the tube beyond a predetermined location. Upon a fish striking and attempting to escape with the bait, the fish snaring member will be pulled downwardly with substantial force until the cap member engages the upper annular stop member. The resulting recoil applied to the fishing line will firmly set the hook within the fish's mouth. Attempting to drag the buoyant housing beneath the water will eventually tire the fish allowing the fisherman to easily retrieve the fish from the hook.

Preferably, the tube and shaft are constructed with plastic or a similar lightweight material. However, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A floating fish snaring device comprising:
    a housing formed of a buoyant material and having an upper end and a lower end;
    an elongated hollow tube coaxially received within the housing; said tube having an upper end and a lower end, said tube comprising a plate at said upper end thereof that rests on the upper end of the housing to prevent the housing from sliding up on the tube during use, and said plate and said upper end of the housing extending in parallel planes;
    an upper annular stop member fixedly positioned within the tube;
    an elongated fish snaring member received within the tube, said fish snaring member having an upper end and a lower end, said fish snaring member includes a small float at the lower end thereof for biasing the fish snaring member upwardly when placed in water, and said float having a diameter that is smaller than a diameter of said tube;
    a cap member at the upper end of said fish snaring member;
    a fishing line and accompanying hook attached to the lower end of said fish snaring member whereby when a fish bites bait on said hook and attempts to escape therewith, said fish snaring member is pulled downwardly until said cap engages said upper annular stop member at which time a recoil is applied to said hook to set it in the fish's mouth.

2. The fish snaring device according to claim 1 further comprising a weighted, ballasting collar attached to the lower end of the tube.

3. The fish snaring device according to claim 2 wherein the hollow tube and collar each include an aligned slot thereon for receiving fishing line so that when the device is not in use, the fishing line is first threaded into the slots and then wrapped about the housing whereby the slots prevent the line from unwinding.

4. The fish snaring device according to claim 1 further comprising a lower stop member positioned within said tube and above said float, whereby said float engages said lower stop member when submerged in water thereby restricting an upward displacement of said fish snaring member.

5. The fish snaring member according to claim 1 wherein said housing includes a circumferential reflective strip allowing a user to more easily locate said housing in darkness.

6. A floating fish snaring device comprising:
    a housing formed of a buoyant material and having an upper end and a lower end;
    an elongated hollow tube coaxially received within the housing, said tube having an upper end and a lower end, said tube having a lower portion extending beyond the lower end of the housing, said tube comprising a plate at said upper end thereof that rests on said upper end of the housing to prevent the housing from sliding up on the tube during use, and said plate and said upper end of the housing extending in parallel planes;
    an upper annular stop member fixedly positioned within the tube;
    an elongated fish snaring member received within the tube, said fish snaring member including a shaft having an upper end and a lower end, said fish snaring member includes a small float at the lower end of said shaft for biasing the fish snaring member upwardly when placed in water, and said float having a diameter that is smaller than a diameter of said tube;
    a cap member at the upper end of said shaft;
    a fishing line and accompanying hook attached to the lower end of said fish snaring member whereby when a fish bites on said hook and attempts to escape therewith, said fish snaring member is pulled downwardly until said cap engages said upper annular stop member at which time recoil is applied to said hook to set it in the fish's mouth.

7. The fish snaring device according to claim 6 further comprising a weighted, ballasting collar attached to a lower end of the tube.

8. The fish snaring device according to claim 7 wherein both the hollow tube and collar each include an aligned slot thereon for receiving fishing line so that when the device is not in use, the fishing line is first threaded into the slots and then wrapped about the housing whereby the slots prevent the line from unwinding.

9. The fish snaring device according to claim 8 further comprising a lower stop member positioned within said tube and above said float, whereby said float engages said lower stop member when submerged in water thereby restricting an upward displacement of said fish snaring member.

10. The fish snaring member according to claim 9 wherein said housing includes a circumferential reflective strip allowing a user to more easily locate said housing in darkness.

11. The fish snaring member according to claim 10 wherein said small float includes an eyelet to which said fishing line is secured.

* * * * *